United States Patent Office 2,821,510
Patented Jan. 28, 1958

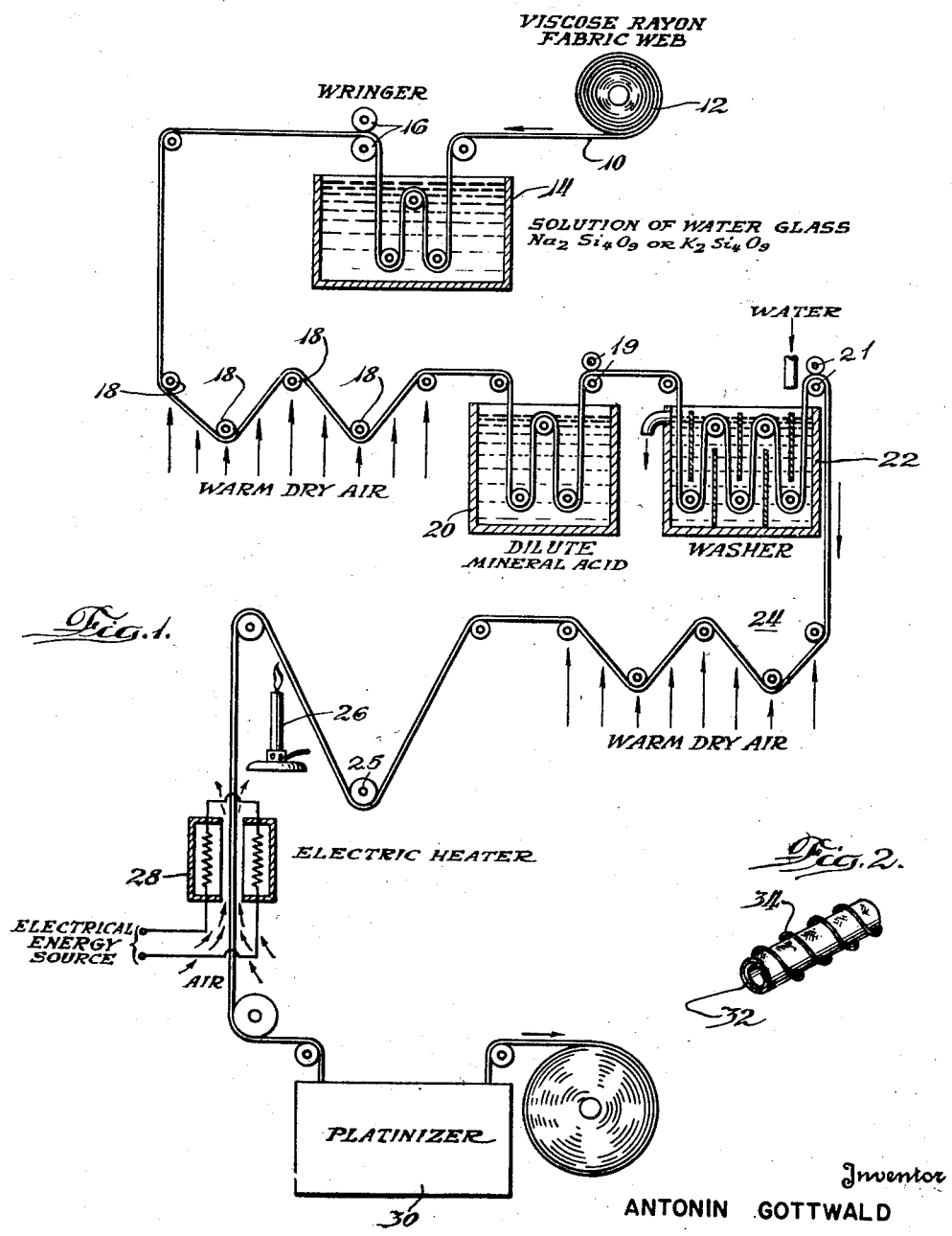

2,821,510

CATALYST CARRIER FOR CATALYTIC HEATERS AND METHOD OF MAKING SAME

Antonin Gottwald, Burbank, Calif.

Application January 20, 1954, Serial No. 405,209

7 Claims. (Cl. 252—422)

My invention relates generally to catalytic heaters and catalytic oxidation apparatus, and more particularly to carriers for the catalytic agent employed in such devices, and to the method of making the same.

As is well known, combustion of hydrocarbons, such as gasoline, may take place at a relatively low temperature in a heater, without the production of a flame and without producing smoke. Such heaters are useful in places where the presence of a flame might constitute a fire hazard such as in heating gasoline engines used in airplanes and automobiles to facilitate their starting in cold climates. Such catalytic heaters may be made to operate without attention for long periods of time, and do not present a fire hazard since mixtures of the hydrocarbon fuel and air in the presence of the catalyst will not result in an explosion. Furthermore, such heaters, when provided with a good catalyst carrier, and otherwise properly constructed, utilize the fuel very efficiently.

In the past, the most satisfactory carrier for the catalyst consisted of asbestos fibers impregnated or coated with a platinum black. Such carriers for the catalyst are, however, not entirely satisfactory, since it is necessary to hold the carrier between supporting metal screens of which the top or outer screen dissipates a large portion of the heat during the catalytic combustion process. In such carriers, the fuel vapor usually was made to pass through the catalyst carrier to the outer or upper screen where the catalytic process occurred. The outer screen, therefore, was disadvantageous because by contacting the catalyst carrier the outer screen cooled the catalyst and slowed up the flameless oxidation of the fuel. Furthermore, such screen enclosed carriers do not provide adequate access of atmospheric oxygen to the catalytic surface of the carrier where combustion should be taking place.

It may be added that the asbestos wool catalyst carrier was with difficulty distributed evenly between the two screens, so that hydrocarbon vapors would not flow through the carrier uniformly but would pass through the portions where the least asbestos wool was placed, and in these places there would not be sufficient catalyst to cause complete combustion, and, as a result, much of the hydrocarbon vapor passed through the carrier without having been oxidized or burned.

It is therefore a primary object of my invention to overcome the foregoing disadvantages of prior catalyst carriers for heating units.

A further object is to provide an improved catalyst carrier which has the appearance and form of a fabric which thus provides a large uniform area for the catalyst, and which will cause the combustion to take place uniformly throughout the carrier.

A further object is to provide an improved catalyst carrier which, due to its strength, may be supported without requiring that any substantial portion of its area be in contact with heat conducting metallic parts, and which, due to its form, functions at a higher temperature, so that impurities which may be present in the hydrocarbon fuel or which may fall as dust upon the carrier, are burned off.

A further object is to provide an improved catalyst carrier which, due to its form and arrangement, may be readily ignited.

A further important object of the invention is to provide an improved catalyst carrier which, although it is fragile, is very much stronger than prior carriers of this general type, and is therefore capable of withstanding hard usage, shock, and vibration.

A further object is to provide an improved catalyst carrier which will have a much longer useful life than prior art devices of this character.

A further object is to provide an improved catalyst carrier in the form of a hollow cylinder, by which a relatively large surface of the carrier for combustion is made available.

A further object is to provide an improved catalyst carrier which is substantially self-supporting, so that it is not necessary to provide screens or the like to hold the carrier in place.

A further object is to provide an improved method of making a catalyst carrier, to which the catalyst may readily be applied to provide a uniform surface at which the catalytic reaction may take place, and which is of low thermal conductivity, thus facilitating the maintenance of the reaction.

Other objects will appear from the following description, reference being had to the accompanying drawings, in which Fig. 1 constitutes a diagram illustrative of the process or method of making the catalyst carrier; and Fig. 2 is a perspective of a catalyst carrier in the form in which it may be used in a small pocket heater.

The process of making the carrier may be a batch process or a continuous process, it being illustrated in the drawing as a continuous process wherein a web of a natural or an artificial fabric 10, preferably woven viscose rayon, is drawn from a supply roll 12 and fed over suitable rollers through a tank 14 containing an aqueous solution of water glass, of the alkali metals, as, for example, sodium, potassium, etc., or a mixture thereof, at a density of not more than 25° Bé. and not less than 21° Bé. which range is of considerable importance in assuring that the finished product will be of proper texture. Lower density results in a product which is too frail and higher density results in a product which is too brittle. After passing through and being impregnated and coated with this solution, the web is fed through a pair of rolls 16 constituting a wringer, to remove the excess of the water glass solution. The web is then dried in a suitable manner, but preferably at a temperature not greater than 100° C., the drying step being illustrated herein by showing the web passing over a plurality of rollers 18 which are located in a stream of warm dry air, the temperature of which is important in that substantially higher temperatures cause hardening of the material which often results in breakage during the ultimate heat treatment at the electric furnace 28.

After being thus dried, the web is fed through an aqueous solution of a mineral acid, as, for example, nitric acid ($HNO_3$), or hydrochloric acid (HCl), or mixtures thereof, contained within a tank 20. The proportion of acid to water should be one part of acid to three to five parts of water. The web should preferably take from two to ten minutes to pass through the acid solution so as to allow adequate time for the reaction of the acid on the water glass. The period of passage through the acid solution should be within the prescribed limits because too short or too long a time affects the durability of the material and may result in undesired brittleness during passage through the electric furnace 28. It is believed that silicic acid and sodium chloride are among the products formed. Of course, if potassium silicate water glass is used, potassium chloride will be formed instead of sodium chloride. After this reaction has been completed, the web is fed through wringer rolls 19 to remove excess solution and then through a wash tank 22, through which there is a constant flow of fresh water, thus removing the soluble chloride salt. Thereafter, the web is passed between wringer rolls 21 to remove excess and is then again dried as indicated at 24, by being passed through a stream of warm dry air preferably not exceeding 200° F. which is about sufficient to maintain the light color of the material all the way to the electric furnace 28.

After being thoroughly dried, the web is ignited, as, for example, by a gas burner 26, and the viscose rayon is burned. This burning must be carefully controlled and is quite slow (about 1 to 2 inches per minute). The burning may travel or be directed downwardly toward the lower roller 25 but should never reach this roller. By moving the material at the proper speed, the burning is maintained at approximately the same location and it has been found that this uniformly burned material remains straight, does not twist and remains strong enough to be pulled as a fabric. However, if the flame were permitted to go beyond the roller 25 to the upward reach of the material, it would become twisted by the uncontrolled burning and rendered impure by smoke sediment which smoke trace would not be removed even in the electric furnace and the impurities would make the platinizing difficult. After being burned in this manner, the web will appear dark in color and it is then passed through a suitable electrical oven or heater 28 which heats the charred web to a temperature of from 1200° F. to 2000° F., and preferably around 1600° F., in the presence of an adequate supply of air, thus oxidizing any remaining carbon. The upper and lower temperature limits should be observed carefully because the heat below the 1200° F. limit is not sufficient to cause proper melting and the heat over the 2000° F. limit has the tendency to render the product too hard and brittle. It is believed that in the course of this heating, some reaction between the carbon of the products of combustion of the viscose rayon and the silicic acid takes place since probably some silicon dioxide from the hydrated form, silicic acid, is available for reaction with the carbon at the elevated temperature of preferably 1600° F., and the web emerges from this heater with a light cream colored appearance. By the present heating procedures, the carbon and other impurities which would render the product useless in a few hours, are removed so as to eliminate deleterious effects on the platinum cover and render the product useful for a calculated 5000 hours of intensive operation. It will be understood that the viscose rayon is entirely consumed, but that the remaining ash and compounds resulting from the chemical reaction retain the general appearance of a woven fabric, and the web, although somewhat fragile, is sufficiently strong that it may be conveyed over rollers and handled without being damaged.

Thereafter, the web is platinized by being fed through a suitable platinizer 30, whereby, using any of several well known expedients, platinum or platinum black is applied uniformly over all exposed surfaces of the carrier.

The amount of platinum required is approximately one-fifth the amount of platinum which would be required to platinize asbestos fibers, the catalyst carrier most commonly used in the past.

Short lengths of the web may then be severed and wound into a hollow cylinder shape as shown at 32 in Fig. 2. While it is not essential, this carrier may then be placed in a protective helical wire cage 34 made of thin wire and spaced from the outer surface of the carrier throughout most of the length of the wire so as to reduce to a minimum the rate of heat conduction from the carrier.

The platinized catalyst carrier of my invention will have a useful life, at least three times as long as platinized asbestos fibers.

It should be observed that the heating by the heater 28 should raise the web to a sufficiently high temperature, and sufficient air should be available in this heater, that the web emerging from this heater is of a uniform white to cream color.

The platinized catalyst carrier is sufficiently strong that it may be handled, cut, and formed to the desired shape, and will have a long useful life even when used on vehicles or in other places where it is subject to shock and vibration.

From the foregoing description, it will be apparent that I have invented a new catalyst carrier which, due to its uniformity in porosity, and due to other physical and chemical properties, is very efficient in use, may be produced at a low cost, and will have a long useful life. The process employed in the manufacture of the catalyst carrier is relatively simple, and can be carried out using chemicals of the technical grade of puirity.

It will be apparent to those skilled in the art that a number of variations in the process and in the materials used may be made without departing from the underlying principles of the invention. I therefor desire, by the following claims, to include within the scope of my invention all such equivalent steps and equivalent materials by which substantially the results of my invention may be obtained in substantially the same manner.

The invention is hereby claimed as follows:

1. The method of making a substantially non-brittle catalyst sufficiently strong for use in heaters to facilitate the combustion of hydrocarbon fuels which comprises impregnating and coating a combustible cellulose fiber textile fabric with a solution of waterglass of a density between 21° Bé to 25° Bé., thoroughly drying the fabric at a temperature not greater than 100° C., immersing it in a dilute aqueous solution of a mineral acid for a sufficient length of time for the conversion of the waterglass into silicic acid with a salt, washing the fabric to remove the formed salt, again drying the fabric at a temperature not greater than 200° C., igniting the fabric in air to cause combustion thereof, heating the residue in an atmosphere containing oxygen to a temperature between 1200 and 2000 degrees Fahrenheit sufficient to cause any carbon in the residue to combine with the silicic acid and with oxygen, and treating the residue with a platinum compound selected from the group consisting of platinum and platinum black.

2. The method of making a substantially non-brittle catalyst sufficiently strong for use in heaters to facilitate the combustion of hydrocarbon fuels which comprises impregnating a combustible cellulose fiber textile fabric with a solution of waterglass of a density between 21° Bé. and 25° Bé., drying the fabric at a temperature preventing hardening thereof; immersing it in a dilute solution of an acid taken from the group consisting of nitric acid and hydrochloric acid, for a period of two to ten minutes for the conversion of the waterglass into silicic acid and a salt; removing the formal salt from the fabric, again thoroughly drying the fabric; igniting the fabric in air to cause combustion thereof while moving the fabric at the rate of one to two inches per minute; and heating the residue to a temperature of 1200 to 2000 degrees Fahrenheit, and treating the residue with a platinum compound selected from the group consisting of platinum and platinum black.

3. The method of making a substantially non-brittle catalyst sufficiently strong for use in heaters to facilitate the combustion of hydrocarbon fuels which comprises impregnating a viscose rayon fabric with an aqueous solution of waterglass of a density between 21° Bé. and 25° Bé.; drying the fabric at a temperature preventing hardening thereof; immersing it in a dilute solution of three to five parts water to one part of an acid taken from the group consisting of nitric acid and hydrochloric acid, for a period of two to ten minutes for the conversion of the waterglass into silicic acid and a salt; removing the formed salt from the fabric, again drying the fabric, and heating the treated fabric to a temperature between 1200 and 2000 degrees Fahrenheit in an atmosphere containing oxygen; and treating the residue with a platinum compound selected from the group consisting of platinum and platinum black.

4. The method of making a substantially non-brittle catalyst sufficiently strong for use in heaters to facilitate the combustion of hydrocarbon fuels which comprises impregnating and coating a combustible cellulose fiber textile fabric with a solution of waterglass of a density between 21° Bé. and 25° Bé.; drying the fabric at a temperature not exceeding 100° C.; reacting the waterglass carried by the fabric with an acid taken from the group consisting of hydrochloric acid and nitric acid for a period of two to ten minutes; washing the water soluble products of the reaction from the fabric; squeezing the fabric to remove excess solution; again drying the fabric at a temperature not exceeding 200° C.; igniting the fabric in air to cause combustion thereof; heating the residue in air to a temperature of about 1600 degrees Fahrenheit; and treating the residue with a platinum compound selected from the group consisting of platinum and platinum black.

5. The method of making a substantially non-brittle catalyst sufficiently strong for use in heaters to facilitate the combustion of hydrocarbon fuels which comprises impregnating a combustible cellulose fiber textile fabric with a solution of waterglass having a density not exceeding 25° Bé. and not less than 21° Bé., drying the fabric at a temperature not exceeding 100° C., immersing the fabric in a dilute aqueous solution of three to five parts water to one part of a mineral acid for a period ranging from two to ten minutes for the conversion of the waterglass into silicic acid and a salt, washing the fabric to remove the formed salt, again drying the fabric at a temperature not exceeding 200° C., igniting the fabric in air to cause combustion thereof while continuously moving the fabric at the rate of about one to two inches per minute, heating the residue in an atmosphere containing oxygen at an elevated temperature between 1200 and 2000 degrees F. to cause any carbon in the residue to combine with the silicic acid and oxygen, and treating the residue with a platinum compound selected from the group consisting of platinum and platinum black.

6. A catalyst having the appearance and form of a fabric and consisting of carbonized cellulosic fibers and silica treated with platinum, made by the method of claim 1.

7. A catalyst as claimed in claim 6 in the form of a cylindrical roll.

References Cited in the file of this patent
UNITED STATES PATENTS

| | | |
|---|---|---|
| 603,473 | Ohlhaver | May 3, 1898 |
| 612,614 | Porter | Oct. 18, 1898 |
| 614,555 | Killing | Nov. 22, 1898 |
| 614,556 | Killing | Nov. 22, 1898 |
| 640,554 | Friedeberger | Jan. 2, 1900 |
| 660,114 | Langhans | Oct. 23, 1900 |
| 671,001 | Richardson | Apr. 2, 1901 |
| 2,162,893 | Kuhl | June 20, 1939 |
| 2,198,195 | Groll et al. | Apr. 23, 1940 |
| 2,337,628 | Schulze | Dec. 28, 1943 |
| 2,399,981 | Brith | May 7, 1946 |